A. R. REYNOLDS.
Method of Tempering Knife Sections for Harvesters.
No. 57,655. Patented Aug. 28, 1866.
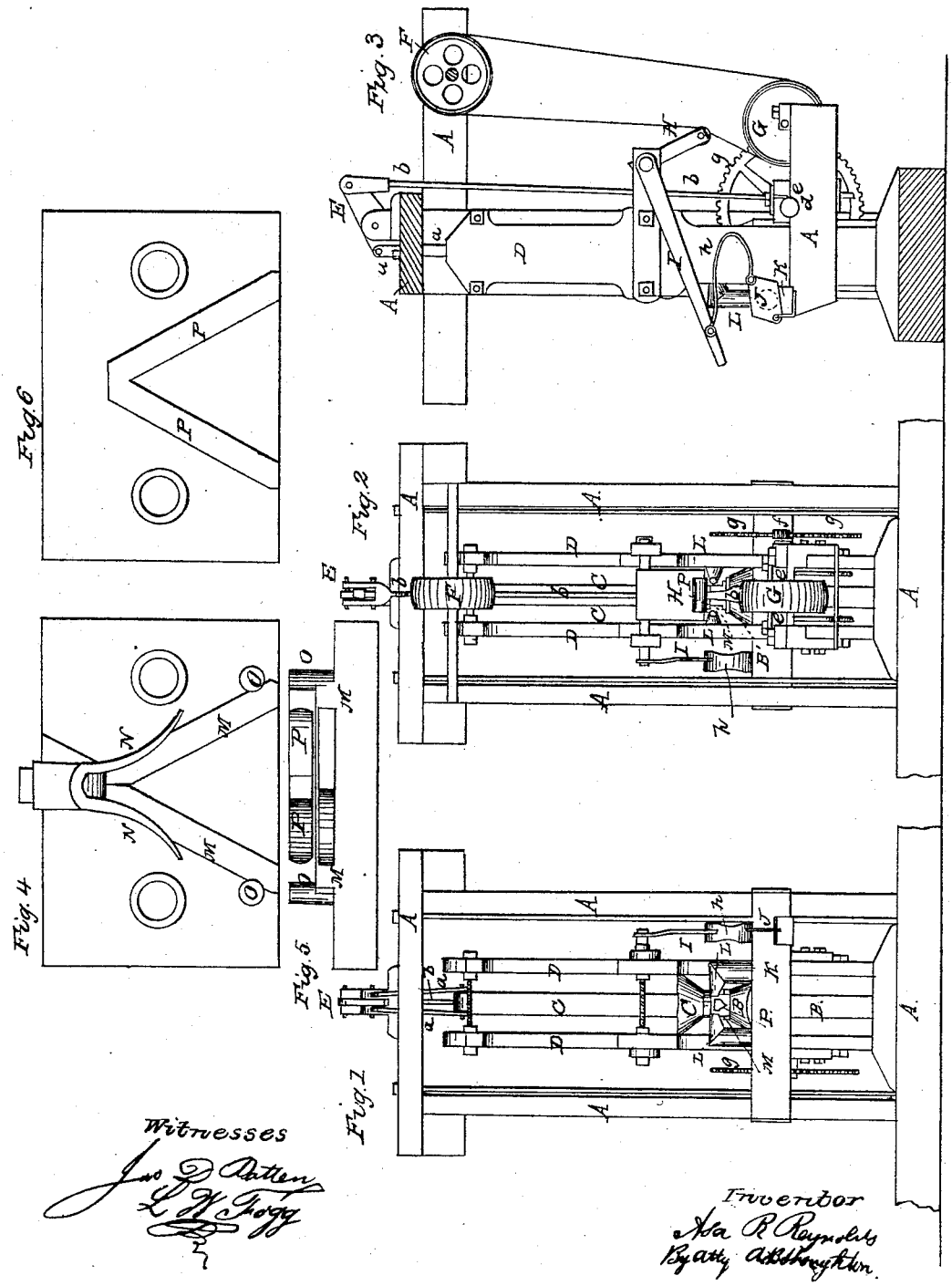

UNITED STATES PATENT OFFICE.

ASA R. REYNOLDS, OF AUBURN, NEW YORK.

IMPROVED METHOD OF TEMPERING KNIFE-SECTIONS FOR HARVESTERS, &c.

Specification forming part of Letters Patent No. 57,655, dated August 28, 1866.

*To all whom it may concern:*

Be it known that I, ASA R. REYNOLDS, of Auburn, in the county of Cayuga and State of New York, have invented a new and useful Improvement in Tempering Knife-Sections for Harvesting-Machines and other purposes; and I do hereby declare the following to be a full, clear, and exact description of the manner of accomplishing the same, reference being had to the accompanying drawings, making a part of this specification, in which—

Figure 1 represents a front view of a machine which I have successfully used for the purpose of tempering. Fig. 2 represents a rear view of the same. Fig. 3 represents a vertical section through the machine. Fig. 4 represents, on an enlarged scale, the under or anvil die, on which the blade to be tempered is placed to receive the blow and contact of the upper or hammer die, or "drop"-die, as it is termed. Fig. 5 represents a front elevation of the under and upper dies on a similarly-enlarged scale; and Fig. 6 represents a face view of the drop-die on a scale corresponding with the Figs. 4 and 5.

Similar letters of reference, where they occur in the separate figures, denote like parts in all the drawings.

In tempering knife sections or blades, as heretofore practiced, there was great loss encountered from various causes or defects. A hard-tempered edge could be procured, but it was full of small fractures or cracks, and objectionable on that account. The difference of texture or fiber between the hardened edge and the spring temper or untempered center portion caused the steel to crack or part at the line between the two conditions of the metal, so much so that from twenty-five to thirty per cent. of the sections or blades were lost from these causes, which the best skill was unable to remedy by the then practiced mode of tempering.

After much experiment and long experience I found that it was necessary to blend the line of demarkation between the cutlery-tempered edge and the spring-steel temper of the central portion, so as not to make that line abrupt or marked. This much done, there was still another defect to remedy, inasmuch as the extreme edge of the section or blade was not as hard as it should be, or as hard as the other tempered portion adjacent to that edge was, and this less hardened edge had to be ground off to arrive at the properly-tempered portion of the section, which caused waste of metal and expense in grinding. The cause of the extreme edge not taking the proper temper was due to the rounding up of the edges of the section by shearing or cutting them off from the plate, in a great degree, and probably from other causes which I do not pretend to explain, but know the fact from actual and long experiment.

Having satisfied myself of the difficulties that existed in the making of perfect sections or blades, I discovered, as I believed, the proper remedies to be applied to overcome them, and then applied myself to the embracing of the results of my many experiments in some practical form, so that any one could make and apply the invention. For this purpose I have made a practical operating machine for hard-tempering knife sections or blades, in which the difficulties heretofore encountered are completely overcome.

The gist of my invention consists, first, in the discovery that a reactionary blow upon steel, together with contact of metals and weight, will temper steel suitably for any kind of cutlery; and, second, that atmospheric air under pressure, or a heavy blast of air, will give to steel a temper or condition known as "spring" steel, and that the combined blow, pressure, and blast would severally temper the edges with one degree of temper and the center with another degree of temper.

I use no liquid of any kind in tempering, nor is it chilling or case-hardening that takes place. The steel tempered after my process is very elastic, very hard, and very compact, and bears such a cutting-edge as, I know, was never produced before in sections for harvesting-machines, and equal, if not superior, to the very finest qualities of cutlery, at least the finest I have ever been able to find.

Another part of my invention consists in making the die or dies between which the tempering is done beveled or inclined, so that that portion of the section or blade which is to form the cutting-edge shall receive the hardest of the blow, and be gradually reduced where the temper runs out into the spring-steel temper from the cutlery temper or elastic temper.

A short blow of, say, about seven-eighths of an inch, will give about the proper temper. A longer blow gives less temper, so that the degree of temper may be regulated by the height to which the drop die or hammer is raised and let fall. The weight of the hammer, too, affects the process. That which I have found to answer a good purpose weighs about four thousand pounds.

The moment the die falls and the reaction or recoil has taken place, then the die holds the section, blank, or blade by its edges, and a blast of air is let onto the central portion of said blade or blank, so that while the edges are receiving their peculiar elastic temper (which I have called "cutlery" temper, though it is harder, but more elastic, than cutlery edges generally are) the central portion is receiving its peculiar or spring-steel temper. The blast of air also aids to cool the dies.

The edge of the section, blade, or blank is expanded by the blow of the drop-die or hammer, and the steel is refined by the blow and made compact without the least indications of cracks, and the metal is not liable, while held under the drop-die or hammer, to warp or twist. The section, blade, or blank is heated, of course, before it is subjected to the tempering process; and that they may be uniformly heated and uniformly tempered I prefer to heat them in a metal bath, which can be kept at a more uniform temperature.

The rebound or reaction of the hammer or drop-die seems to prevent a sudden chilling of the section or blade, and leaves sufficient heat behind to prevent a hard or cracked chill, while the steel takes a most refined tempered edge.

I find that the greater the blow of the hammer the greater is its vibration or reaction, and that the greater the vibration or reaction the less hard the temper is, so that, say, a half-inch drop of the hammer will produce a higher temper than an inch drop of it will do. I mention these facts as incidental to the rationale of the process, which I do not pretend to give or account for. I only know that the invention, carried out as I have described it, will produce the results I have detailed.

To enable others skilled in the art to use my invention, I will proceed to describe the same with reference to the drawings hereinbefore referred to.

A represents a substantial frame, which may be of wood, that portion of it upon which the anvil B stands being specially made of wood, to get the advantage of its elasticity or reaction from the blow of the drop-die or hammer C. The hammer C moves between side plates, D D, to keep it in proper line, and to cause the die, which it carries on its lower end, to fall accurately upon or over the die upon the top of the anvil B.

The hammer is raised as follows: On top of the frame A there is pivoted a beam, E, to one end of which the hammer C is connected by a link, $a$. To the other end of the beam there is attached a rod, $b$, which extends down to the driving-gear, and has its lower end bent, as shown in red at $c$, so that a tappet (also in red) on the shaft $d$ shall strike said bent portion and draw down the rod, thus raising the hammer, until the tappet in its rotation leaves the bent end, and releases the rod and allows the hammer to drop. Motion is given to the shaft $d$ from the belt or pulley shaft $e$, through a pinion, $f$, on the shaft $e$ and a cogged gear, $g$, on said shaft $d$.

The belt over the pulleys F G may be a slack one, and by means of a belt stretcher or strainer, H, on a lever, I, it can be made taut at any time when it is necessary to raise the drop or hammer; and the gearing may be allowed to run without lifting the hammer by raising the lever I or moving the tightener from the belt.

To the lever I there is connected, by a spring, $h$, a gate, J, which gate closes or opens a wind-trunk, K, at certain periods, through which a current of air is forced from any fan-blower or bellows. From this wind-trunk or passage K two nozzles, L L, extend upward and point toward the die on the anvil B, for the purpose of throwing a current of atmospheric air on or toward said anvil or die upon it, for a purpose to be presently explained.

In Fig. 4 is shown, on a large scale, the die M, that is placed upon the anvil B. This die is of a V form, (as it is designed for tempering V-shaped sections or blades for harvesting-machine cutters, it being understood that the dies must conform to the shape of the blade or cutting instrument that is to be tempered,) and has a forked guide or gage, N, and studs O O connected with it, for the accurately placing and holding of the blade or section to be tempered or hardened.

The legs of the die slope or incline inward, as seen in the section, Fig. 5, so that the blade will rest thereon by its outer edges, or those which are to receive the hard temper, while its other portions are not in metallic contact with said die.

On the under side or lower end of the drop or hammer C there is a plain V-shaped die, P, as seen in Fig. 6, which is so made and arranged as to drop over or upon the under die, M, and to strike the interposed blade or section hardest upon its edges, and allow the blow to run or blend with the central portion of the section, which has no immediate metallic contact with the die or anvil, being supported solely by its edges.

When the drop or hammer has fallen upon the section (previously heated) it has at first a slight rebound, and then settles upon and holds the section. The lever I is then raised to remove the belt-tightener, and in moving it the gate J is raised and a blast of air from a blower of any kind passes through the wind-trunk K and the nozzles L L, and blows upon the central portion of the section or blade that is being tempered, which cools said central portion while its edges are pinched and held between the dies of the drop and the anvil.

Having thus fully described the nature of my invention, what I claim is—

1. Hard-tempering the edges of steel blades or sections by means of a blow from a hammer or drop-press, delivered under conditions and with a reaction substantially such as herein described.

2. Supporting the blade, section, or blank to be hard-tempered by a drop-die or hammer upon, or by its edges upon, an under die having inclined or sloping faces, substantially as herein described.

3. Means for forcing or directing a blast of air upon that portion of the blade which is not to be high-tempered, when used in connection with a hammer or drop-press conditioned for giving a blow and for reacting, substantially as herein described.

ASA R. REYNOLDS.

Witnesses:
C. B. MacDougall,
Wm. H. Seward, Jr.